United States Patent [19]

Ishikawa

[11] Patent Number: 5,607,316
[45] Date of Patent: Mar. 4, 1997

[54] STRUCTURE FOR FIXING A FLAT CABLE TO A CYLINDRICAL ROTATOR

[75] Inventor: Satoshi Ishikawa, Shizuoka-ken, Japan

[73] Assignee: Yazaki Corporation, Tokyo, Japan

[21] Appl. No.: 581,835

[22] Filed: Jan. 2, 1996

[30] Foreign Application Priority Data

Jan. 5, 1995 [JP] Japan .................................. 7-000344

[51] Int. Cl.⁶ .................................................. H01R 39/02
[52] U.S. Cl. ............................................. 439/164; 439/15
[58] Field of Search ............................ 439/164, 15, 162, 439/165

[56] References Cited

U.S. PATENT DOCUMENTS 5,226,831  7/1993  Horiuchi .................................. 439/15

FOREIGN PATENT DOCUMENTS 2-41150  9/1990  Japan .
4-218286  8/1992  Japan .

*Primary Examiner*—Gary F. Paumen
*Assistant Examiner*—T. C. Patel
*Attorney, Agent, or Firm*—Finnegan, Henderson, Farabow, Garrett & Dunner, L.L.P.

[57] ABSTRACT

Disclosed herein is a contactless electric signal transmitter, which includes a rotator having an outer periphery formed with a space for housing a fold of a flat cable. A cover covers the space and fixes the fold therein. The space has both axial side walls formed with first engaging means, respectively. The cover has an outer cylindrical surface of the same curvature as the rotator periphery. The cover also has second engaging means for engagement with the first means, respectively, of the space. The cover may have a recess, through which the cable can extend out of the space. This structure makes it possible to fit the cable fold to the rotator simply and securely at low costs. One axial wall of the groove may have a recess formed in part of it. The recess has an axial slope extending between the outer periphery and the bottom of groove.

8 Claims, 5 Drawing Sheets

STRUCTURE FOR FIXING A FLAT CABLE TO A CYLINDRICAL ROTATOR

BACKGROUND OF THE INVENTION

1. Field of the Invention

The present invention relates to structure for fixing a flat cable to a cylindrical rotator and, more particularly, to structure for fixing the flat cable of the brushless electric signal transmitter of a vehicle steering system to the cylindrical rotator of the transmitter. The rotator is fixed to the steering wheel. The transmitter transmits signals between parts on the steering wheel and the steering column.

2. Description of the Prior Art

In recent years, as automobiles have been electronically controlled, the steering wheels have been fitted with switches for electronic control and electrical equipments for air bags etc. There is a need to electrically wire the switches and equipments to parts on the steering columns. Each steering wheel can rotate by a finite number of turns in both directions. In order to electrically interconnect a part on the steering wheel shaft and a part on the steering column, there is a need of a brush between the parts or a flexible cable between them, which can follow the wheel rotation.

Because the brush is a mechanically sliding contact, which is less reliable, there has been proposed a brushless electric signal transmitter with a flexible flat cable having a number of lead wires. The transmitter includes a rotator fixed to the steering wheel shaft of an automobile, and a housing fixed to the steering column and surrounding the rotator. The cable is either wound vortically, or extends vortically and is turned backward midway, between the rotator and housing. As the shaft rotates, the cable moves in the housing.

There is a need to connect the cable with the lead wires to switches on the steering wheel, and to circuits on the steering column. For this purpose, one or both end portions of the cable are folded at a right angle to extend outward in parallel to the wheel shaft.

For example, Japanese Patent Second (after exam.) Publication H.2-41,150 and First (before exam.) Publication H.4-218,286 each disclose a brushless electric signal transmitter with both end portions of a flat cable folded at a right angle and extending out of the transmitter.

Generally in a conventional brushless electric signal transmitter, as disclosed in the above publications, a plastic or resinous cover keeps the flat cable folded at a right angle. The cover is fitted in a recess formed in the transmitter; the cable extends out of the cover in parallel to the transmitter axis of rotation.

In order to form such a cover at each end of the cable, there is a need to place the cable as folded at a right angle in an injection mold for insert molding. This process involves a number of steps and costly apparatus.

SUMMARY OF THE INVENTION

It is the object of the present invention to provide structure for fixing the flat cable of an electric signal transmitter, which is fitted in a vehicle steering system, to the cylindrical rotator of the transmitter simply without needing insert molding on any cable folds, and without needing a number of process steps.

In accordance with the invention, a form of structure is provided for fixing a flat cable to a cylindrical rotator, around which the cable is wound. The inner end portion of the cable is folded at a right angle and extends outward axially of the rotator, without extending through the rotator. The structure includes a space formed axially in the outer periphery of the rotator to house the cable fold, and a cover for covering the space. The space has both side walls extending axially of the rotator. Each wall has first engaging means. The cover has second engaging means for engagement with the first means of the space. The cover has a substantially cylindrical, outer surface of substantially the same curvature as the outer periphery of the rotator. The cover has a recess through which the cable can extend.

In accordance with the invention, another form of structure is provided for fixing a flat cable to a cylindrical rotator, around which the cable is wound. The inner end portion of the cable is folded at a right angle and extends outward axially of the rotator, without extending through the rotator. The structure includes a space formed axially in the outer periphery of the rotator to house the cable fold, and a cover for covering the space. The space has both side walls extending axially of the rotator. Each of the walls has first engaging means. The cover has second engaging means for engagement with the first means of the space. One of the space walls has a recess, through which the cable can extend. The recess has a bottom slope extending between the bottom of the space and the outer periphery of the rotator. The cover has a substantially cylindrical, outer surface of substantially the same curvature as the outer periphery of the rotator.

The first engaging means may be an axial groove formed in the radially inner side of each side wall of the space. The second engaging means may be a claw or a flange formed on at least one side edge of the cover. The inner surface of the cover may have means for preventing the cable fold from moving in the space.

In fitting the cable to the rotator, it is possible to securely fix the end portion of the cable to the outer periphery of the rotator, only by folding the portion at a right angle, then placing the cable fold in the rotator space, and holding the fold with the cover. As a result, there is no need of molding for the cable fold, so that the component costs may be low.

The nature, principle and utility of the invention will become more apparent from the following detailed description when read in conjunction with the accompanying drawings.

BRIEF DESCRIPTION OF THE DRAWINGS

Preferred embodiments of the present invention are shown below with reference to the accompanying drawings, in which.

DESCRIPTION OF THE PREFERRED EMBODIMENTS

Figure 3:
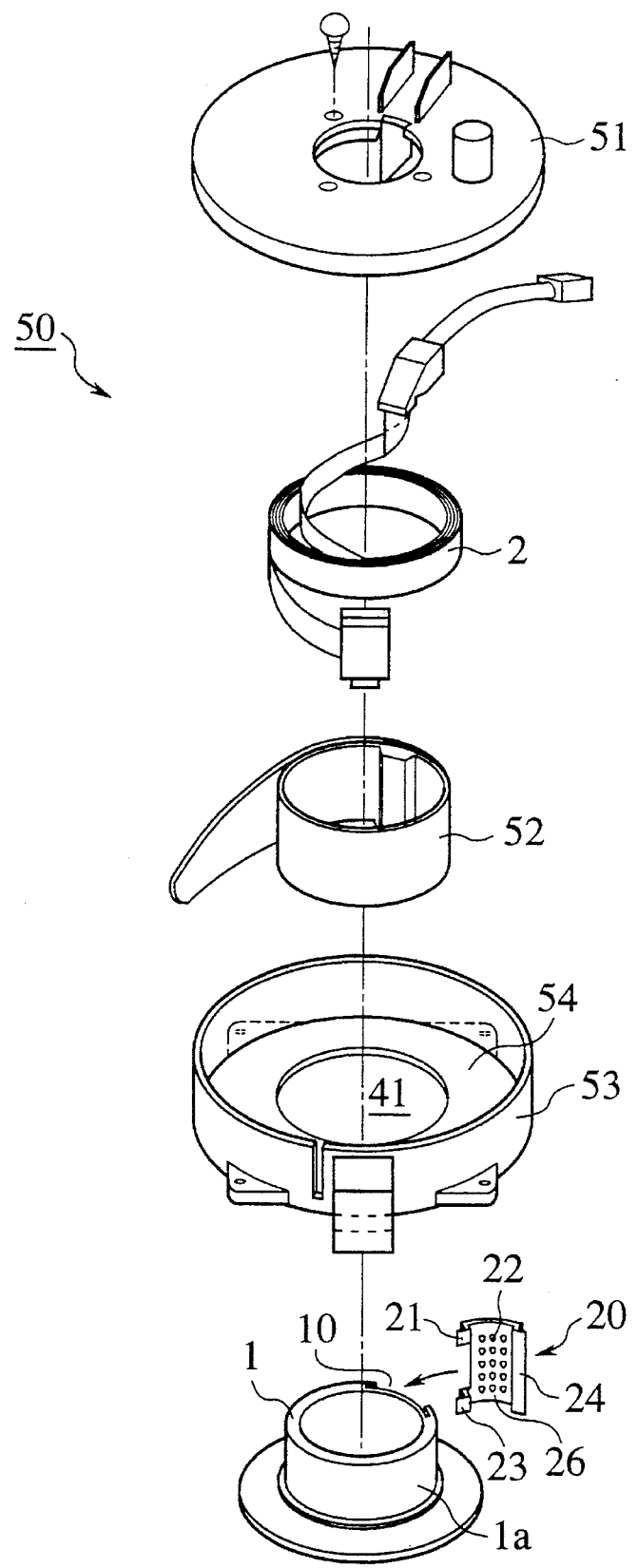
FIG. 3 is an exploded perspective view of the transmitter, to which the structure of FIG. 1A is applied.

With reference to FIG. 3, a brushless electric signal transmitter 50, which is fitted in the steering system of a car, includes a cylindrical rotator 1.

Figure 1A:
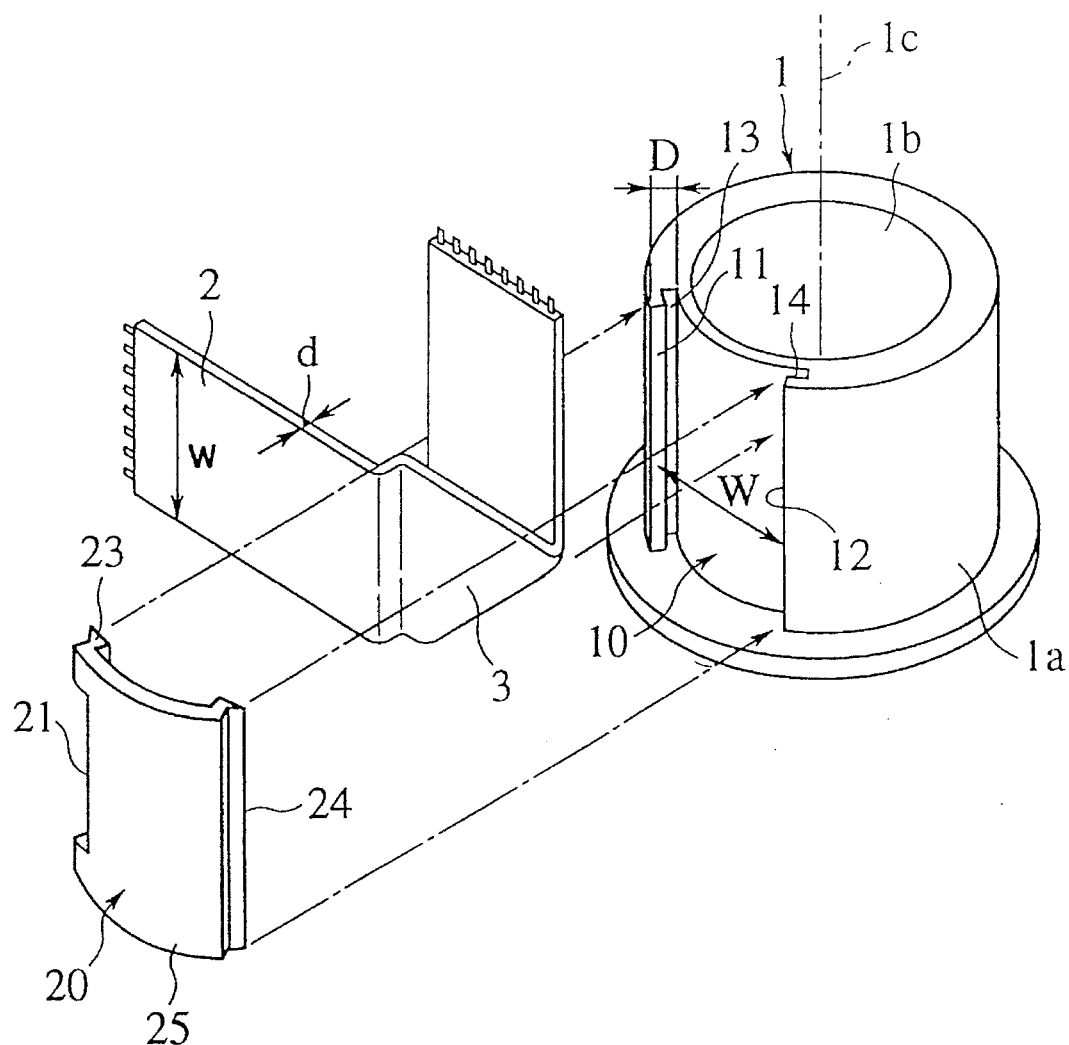
FIG. 1A is an exploded perspective view of structure according to the first embodiment for fixing the cable of the brushless electric signal transmitter of a car steering system to the rotator of the transmitter.
Figure 1B:
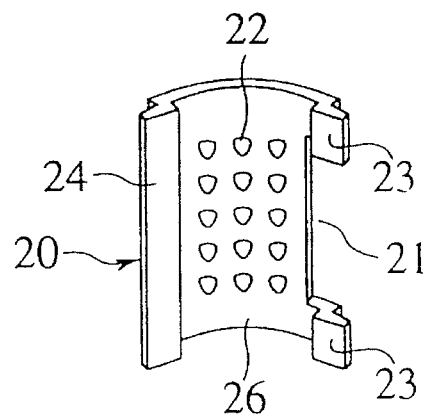
FIG. 1B is a perspective rear view of the cover shown in FIG. 1A.

With reference to FIGS. 1–2, the rotator 1 has a bore 1b formed through it, surrounds the steering wheel shaft (not shown) and is fixed to the shaft. The outer periphery 1a of the rotator has a semicylindric groove 10 formed coaxially with it. A flat cable 2 is wound around the periphery 1a. The inner end portion of cable 2 is folded to turn upward at a right angle, forming a triangular fold 3, which is received in the groove 10. The groove 10 has a width W larger than the cable width w and a depth D more than twice as large as the cable thickness d. The groove 10 has opposite axial side walls 11 and 12 formed with axial grooves 13 and 14, respectively.

The outer surface 25 of a semicylindric cover 20 has the same curvature as the rotator periphery 1a. The cover 20 has a pair of claws 23 on one edge and an axial flange 24 on the other edge. The flange 24 extends entirely along the one edge. The claws 23 are formed on both ends of the other edge. Formed between the claws 23 is a recess or cutout 21. The inner surface 26 of cover 20 has a number of studs or small projections 22, which may otherwise be replaced by ridges.

Figure 2A:
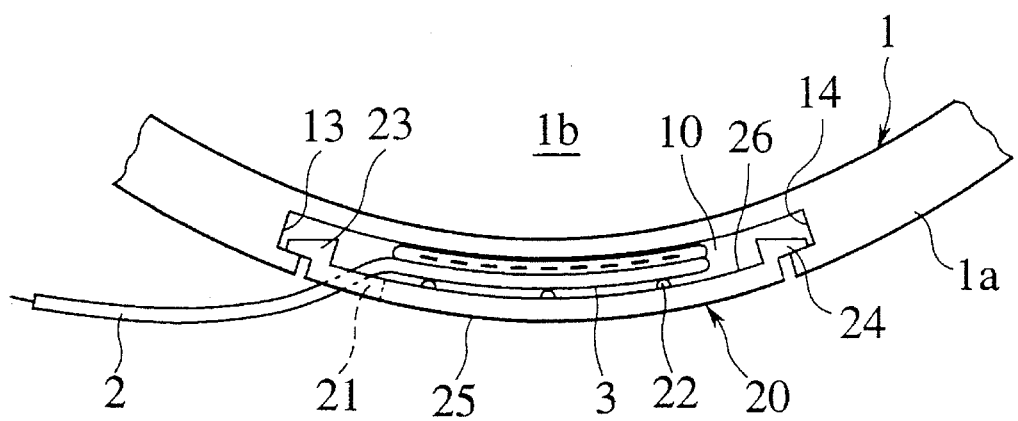
FIG. 2A is an enlarged fragmentary top plan of the structure shown in FIG. 1A.
Figure 2B:
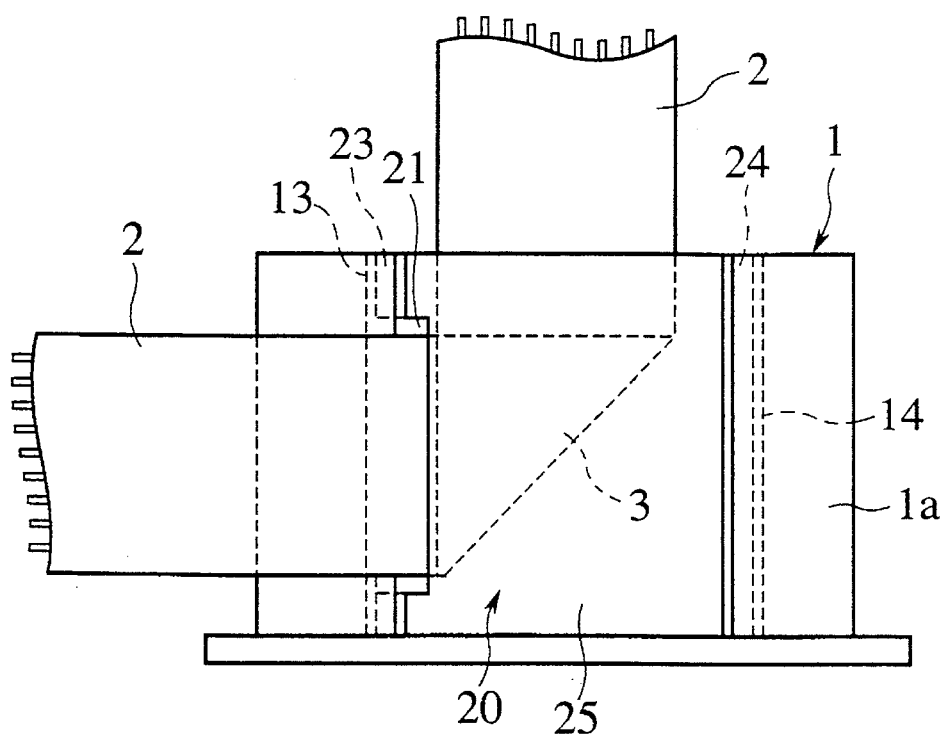
FIG. 2B is a side view of the structure shown in FIG. 2A.

As shown in FIG. 2A and 2B, the claws 23 and flange 24 engage with the axial grooves 13 and 14, respectively, so that the cover 20 covers the cable fold 3 in the semicylindric groove 10. The outer peripheries 1a and 25 of the rotator and cover are flush or aligned with each other.

The cable 2 extends out of the semicylindric groove 10 through the cover recess 21. Some cover projections 22 engage with the cable fold 3 to prevent it from moving in the semicylindric groove 10.

Thus, the cable 2 does not extend through the cylindrical wall of rotator 1 into the bore 1b, but is folded upward at a right angle. The fold 3 can be fixed to the rotator 1 simply and securely without necessity for insert molding on the fold, and for a number of process steps. This results in low component costs, thereby reducing the costs of transmitter 50.

As shown in FIG. 3, the transmitter 50 further includes an under cover 53 mounted on the steering column. The cover 53 has a center opening 41, into which the cylindrical wall of rotator 1 is inserted. An end support 52 loosely surrounds the outer periphery 1a of rotator 1. The cable 2 is fitted to the outside of support 52 and housed inside the cover 53. An upper cover 51 closes the top of under cover 53.

An annular space 54 is formed by the covers 51 and 53 and the rotator 1. The cable 2 is housed in the annular space 54 as it is wound around the rotator periphery 1a through the end support 52. The inner end of cable 2 is fixed to the rotator 1, as already explained; the outer end is fixed to the under cover 53.

Figure 4:
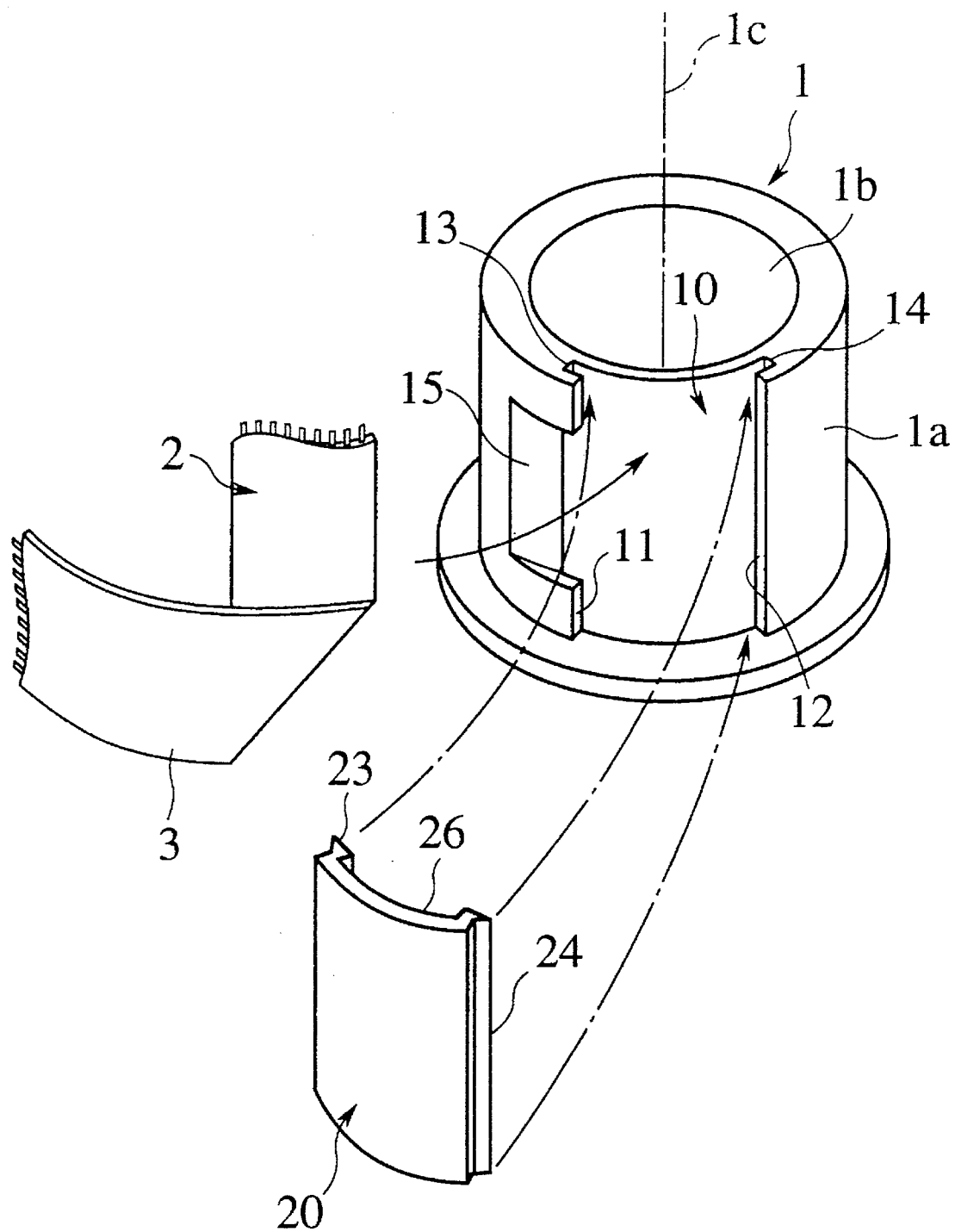
FIG. 4 is a view similar to FIG. 1A, but showing the second embodiment.
Figure 5A:
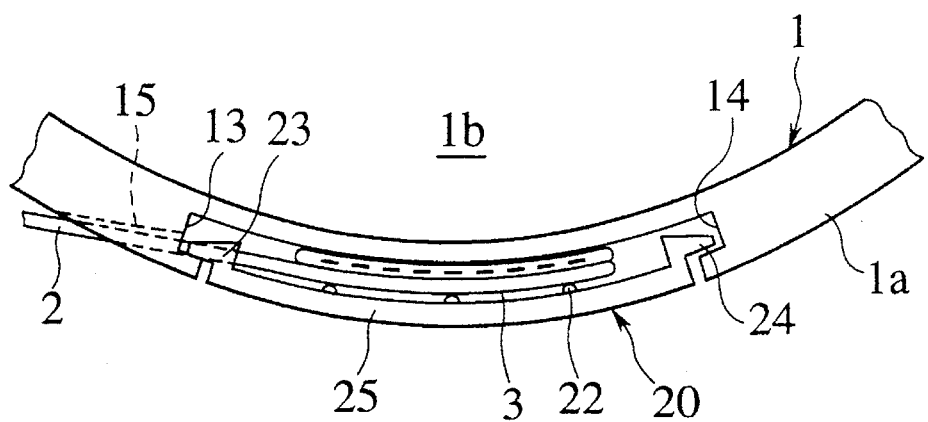
FIGS. 5A and 5B are views similar to FIGS. 2A and 2B, respectively, but showing the second embodiment.
Figure 5B:
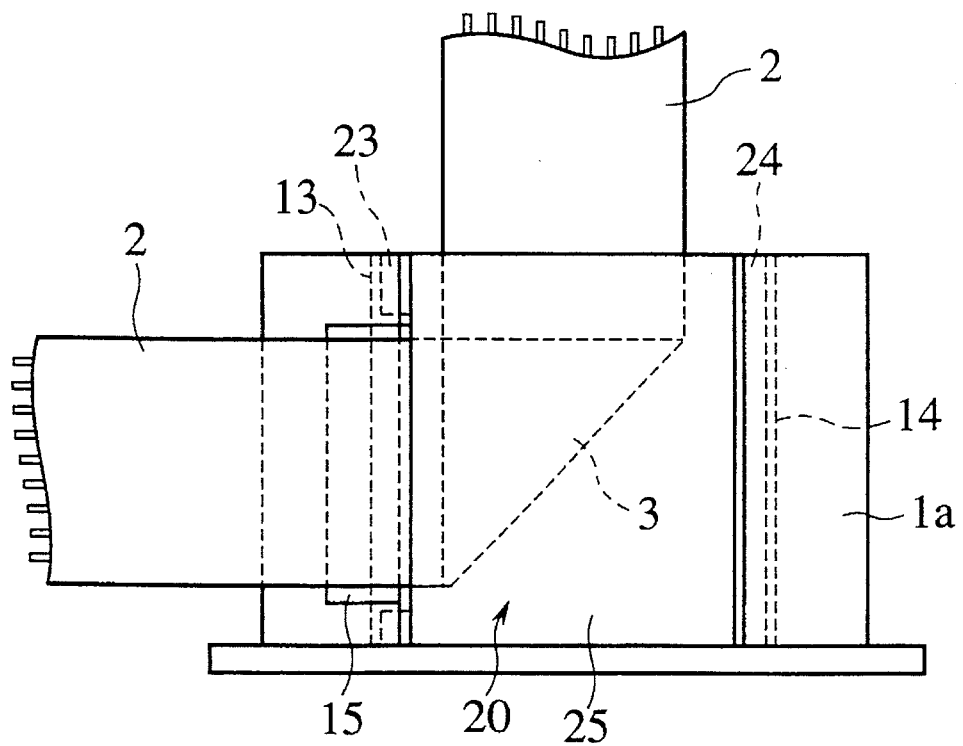

FIG. 4 and 5 show part of another brushless electric signal transmitter according to the invention for a car steering system. The structure of this transmitter is substantially the same as that of the first embodiment; the corresponding parts are given the same numerals and are not explained.

This embodiment differs from the first embodiment only in how the transmitter is adapted for the flat cable 2 to extend out of the semicylindric groove 10 of rotator 1.

In this embodiment, the Semicylindric cover 20 has no such recess as the recess 21 in the first embodiment. Instead, one axial wall 11 of groove 10 has a recess formed in part of it. The recess has an axial slope 15 extending between the outer periphery 1a and the bottom of groove 10. The slope 15 may be so inclined that its axial edge adjacent to the groove 10 and the inner surface 26 of cover 20 define an opening through which the cable 2 extends. The inner surface 26 of cover 20 has small projections 22 (FIG. 5A), some of which engage with the cable fold 3.

The cable 2 is folded upward at a right angle. The fold 3 is placed in the groove 10. The cover 20 covers the fold 3 with the claws 23 and flange 24 engaging with the axial grooves 13 and 14, respectively. The outer peripheries 1a and 25 of rotator 1 and cover 20 are flush with each other. The cable 2 extends out of the semicylindric groove 10 through the slope 15. Some cover projections 22 prevent the cable fold 3 from moving in the semicylindric groove 10.

In this embodiment as well, the cable fold 3 can be fixed to the rotator 1 simply and securely without insert molding on the fold, and without a number of process steps. As a result, the part costs can be low.

Instead of the axial grooves 13 and 14, claws 23 and flange 24, one of the semicylindric groove 10 and cover 20 may otherwise be formed with projections (not shown) on its corners, and the other may be formed with holes (not shown) for engagement with the projections. By engaging these projections with the holes, the cover 20 can be fitted to the groove 10.

As explained above, the cable can be fitted to the rotator easily and securely without a number of process steps by folding it at a right angle, without passing it through the rotator, then placing the fold in the semicylindric groove of the rotator, and holding the fold with a cover. As a result, the apparatus costs can be low.

It should be understood that many modifications and adaptations of the invention will become apparent to those skilled in the art and it is intended to encompass such obvious modifications and changes in the scope of the claims appended hereto.

What is claimed is:

1. Structure for fixing a flat cable to a cylindrical rotator, around which said cable is wound, an inner end portion of said cable being folded at a right angle and extending outward axially of said rotator, without extending radially through a wall of said rotator, said structure comprising:

a space for housing the cable fold, said space being formed axially in the outer periphery of said rotator, said space having side walls, which extend axially of said rotator, and each of which has first engaging means; and a cover for covering said space, said cover having a substantially cylindrical, outer surface of substantially the same curvature as said outer periphery of the rotator, said cover having second engaging means for engagement with said first engaging means of the side walls, said cover having a recess through which said cable can extend.

2. The structure of claim 1, wherein said first engaging means comprises an axial groove formed in each side wall of the space, while said second engaging means comprises a claw formed on at least one side edge of the cover.

3. The structure of claim 1, wherein said first engaging means comprises an axial groove formed in each side wall of the space, while said second engaging means comprises a flange formed on at least one side edge of the cover.

4. The structure of claim 1, wherein the inner surface of said cover has means for preventing said cable fold from moving in said space.

5. Structure for fixing a flat cable to a cylindrical rotator, around which said cable is wound, an inner end portion of said cable being folded at a right angle and extending outward axially of said rotator, without extending radially through a wall of said rotor, said structure comprising:

- a space for housing the cable fold, said space being formed axially in the outer periphery of said rotator, said space having side walls, which extend axially of said rotator, and each of which has first engaging means, one of said walls having a recess, through which said cable can extend, said recess having a bottom slope, which extends between a bottom of said space and said outer periphery of the rotator; and
- a cover for covering said space, said cover having a substantially cylindrical, outer surface of substantially the same curvature as said outer periphery of the rotator, said cover having second engaging means for engagement with said first engaging means of the side walls.

6. The structure of claim 5, wherein said first engaging means comprises an axial groove formed in each side wall of the space, while said second engaging means comprises a claw formed on at least one side edge of the cover.

7. The structure of claim 5, wherein said first engaging means comprises an axial groove formed in each side wall of the space, while said second engaging means comprises a flange formed on at least one side edge of the cover.

8. The structure of claim 5, wherein the inner surface of said cover has means for preventing said cable fold from moving in said space.

* * * * *